No. 768,359. PATENTED AUG. 23, 1904.
O. EISENHUTH.
PIPE COUPLING.
APPLICATION FILED FEB. 3, 1903.
NO MODEL.
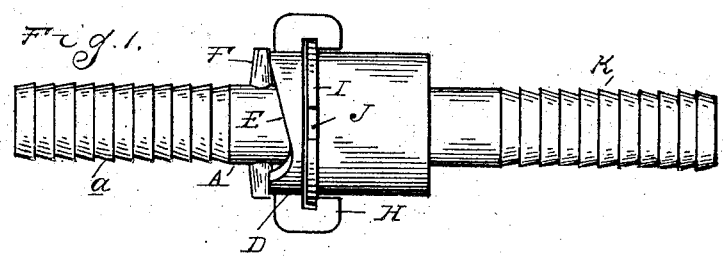
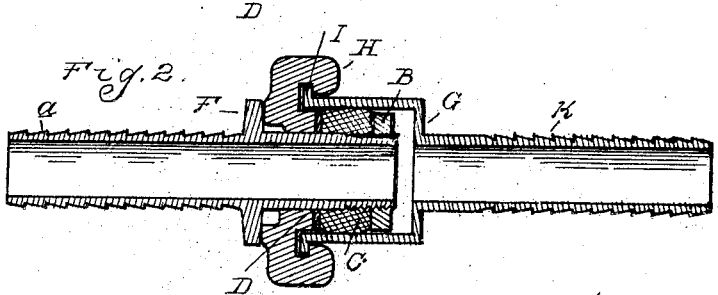
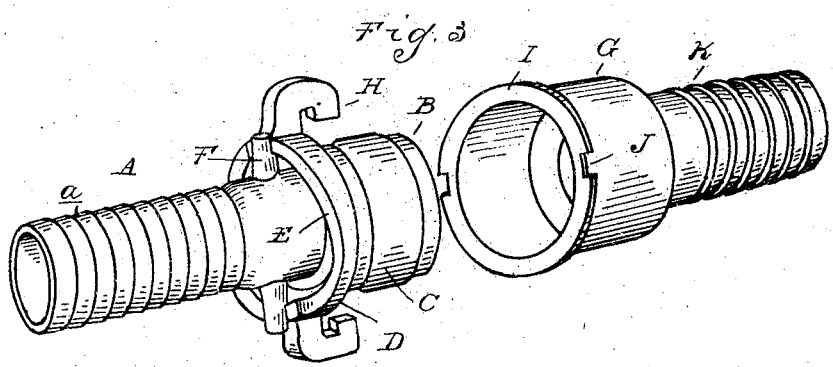
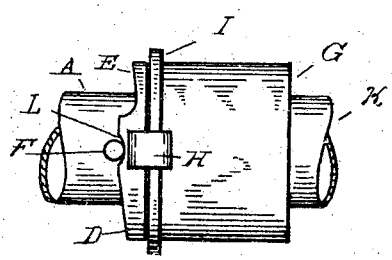
Inventor.
Oscar Eisenhuth.
Witnesses No. 768,359.

Patented August 23, 1904.

UNITED STATES PATENT OFFICE.

OSCAR EISENHUTH, OF DETROIT, MICHIGAN, ASSIGNOR TO AMERICAN PIPE & HOSE COUPLER COMPANY, OF DETROIT, MICHIGAN, A CORPORATION OF MICHIGAN.

PIPE-COUPLING.

SPECIFICATION forming part of Letters Patent No. 768,359, dated August 23, 1904.

Application filed February 3, 1903. Serial No. 141,688. (No model.)

*To all whom it may concern:*

Be it known that I, OSCAR EISENHUTH, a citizen of the United States, residing at Detroit, in the county of Wayne and State of Michigan, have invented certain new and useful Improvements in Pipe-Couplings, of which the following is a specification, reference being had therein to the accompanying drawings.

The invention relates to improvements in pipe-couplings; and it consists in the construction of the joint in which a packing is expanded to make it tight and means are provided to prevent the parts from separating, but which upon increased internal pressure tends to further tighten the joint in proportion to the increase in pressure, all as more fully hereinafter described, and particularly pointed out in the claims.

In the drawings, Figure 1 is a side elevation of my improved coupling, showing the parts engaged. Fig. 2 is a vertical central longitudinal section therethrough. Fig. 3 is a perspective view of the two parts detached. Fig. 4 is a detail illustrating the means of frictionally locking the cam and the male member to prevent accidental disengagement of the parts.

A represents the tubular male member, which is in the shape of a tube, having in this case the corrugations *a* at one end, to which a hose may be attached. On the inner end of this tube is a shoulder, preferably in the form of a nut B, adjustable by a screw-threaded engagement with the end portion of the member A, as shown.

Sleeved on the male member is the packing-ring C, preferably of rubber. At the outer end of this packing-ring is a ring D, bearing at its inner end upon the outer end of the packing-ring C. On the ring D are two inclines or cams E, against which the lugs F on the male member bear. This ring D is also adapted to be detachably locked to the female member G by means of hooks H on the ring engaging the flange I thereon, said flange having entering slots J, as shown in Figs. 1 and 3.

The female member G is in the shape of a tube or barrel, into which the packed end of the male member engages and loosely fits, and this barrel preferably has an integral nipple K, to which a hose may be attached.

The parts being thus constructed, they are used as follows: The operator engages the packing on the male member into the barrel of the female member, as shown in Fig. 2. At the same time the hooks enter the slots J. A partial rotation of the parts brings the flange I into the hooks, as shown in Figs. 1 and 2. A rotation of the male member, the ring D being held from rotation, or turning the ring D, the coupling members being held, causes the lugs F to ride up the inclines or cams, moving the male member slightly outward in the female member and compressing and expanding the packing between the shoulder or nut B and the ring D, such expansion causing it to be pressed against the inside walls of the female member.

As there is a sliding engagement between the member A and the ring, any pressure within the coupling acting against the end of the male member will tend to force it out, thereby increasing the expansion of the packing and making the joint tighter just in proportion as the pressure increases, while the hooks on the ring hold the parts together so they cannot be separated except by such a rotation as will bring the hooks H and slots J into registration.

To prevent the accidental rotation of the two parts, I preferably make slight notches L, Fig. 4, in the cams, into which the lugs F may engage when the packing is compressed.

It will be observed that the joint is made solely by the expansible packing and that the greater the pressure within the tighter the joint.

What I claim as my invention is—

1. In a pipe-coupling, the combination of a male member, terminating in a nipple, a shoulder at the end of the nipple, a ring on the nipple at the other end, an elastic packing-ring on the nipple between the shoulder and ring, a cam for compressing and thus expanding the packing between the ring and shoulder, a female member into which the nipple is adapted to fit and in which when expanded the packing is adapted to fit tightly, and a detachable locking connection between the male and female members preventing longitudinal disengagement, but permitting a slight longitudinal movement of the male member by further compressing the packing thereon.

2. In a pipe-coupling, a tubular male member, a packing-ring on the tube, a ring loose on the tube, a cam for moving the ring longitudinally on the tube to compress and expand the packing-ring laterally, a female member to receive the male member and be engaged by said packing-ring, and a hook connection between the ring in the male member and the female member, for the purpose described.

3. In a pipe-coupling, a tubular male member, having an expansible packing, a tubular female member into which the male member enters and with which the packing thereof engages, a ring loosely embracing the male member, a cam on the ring, and a detachable hook connection between the ring and female member, whereby endwise movement of the male member tending to separate the two members by internal pressure acts to expand the packing and make a tighter joint the greater the pressure.

4. In a pipe-coupling, the combination of a tubular female member, a tubular male member, an expansible packing thereon fitting into the female member, a ring loosely embracing the male member and contacting the upper end of the packing, cams on the ring, hooks on the ring, bearings on the female member with which said hooks detachably engage, and bearings on the male member bearing against the cams on the ring, the parts being combined so that when the parts are engaged a rotation of the male member on the ring will move said member longitudinally and compress the packing, and whereby internal pressure will tend to further move said member to increase the expanding effect of the packing as the pressure increases.

5. In a pipe-coupling, the combination of a female member, a male member, an expansible packing for the male member, a ring loosely engaging the male member for contacting the packing with the female member, a cam on the ring, means for engaging the cam to compress the packing, and a hook on the ring adapted to engage the female member for forming a detachable connection between the male and female members.

6. In a pipe-coupling, the combination of a female member, a male member, an expansible packing for the male member, a ring loosely engaging the male member for contacting the packing with the female member, cams on the ring, projections on the male member for engaging the cams to compress the packing, and a hook on the ring adapted to engage the female member for forming a detachable connection between the male and female members.

7. In a pipe-coupling, the combination of a female member, of a male member, an expansible packing for the male member, a ring loosely engaging the male member for contacting the packing with the female member, cams on the ring, projections on the male member for engaging the cams to compress the packings, means on the cams for limiting the movement of the projections on the male member, and a hook on the ring adapted to engage the female member for forming a detachable connection between the male and the female member.

8. In a pipe-coupling, the combination of a female member, of a male member, an expansible packing for the male member, a ring loosely engaging the male member for contacting the packing with the female member, cams on the ring, projections on the male member for engaging the cams to compress the packing, means on the cams for limiting the movement of the projections on the male member, hooks on the ring, and bearings on the female member arranged to be engaged by the hooks to detachably connect the male and female members.

9. In a pipe-coupling, a tubular male member, a packing-ring on the tube, a ring loosely mounted on the tube, means for moving the ring longitudinally on the tube to compress the packing, a female member to receive the male member, and to be engaged by said packing-ring, and hooks on the ring adapted to engage bearings on the female member to detachably connect the two sections.

10. In a pipe-coupling, a male member, a packing on the male member, a ring loosely mounted on the male member, means for moving the ring to compress the packing, a female member adapted to receive the male member and to be engaged by said packing, and a hook on the ring arranged to engage the female member to detachably connect the two sections.

In testimony whereof I affix my signature in presence of two witnesses.

OSCAR EISENHUTH.

Witnesses:
M. B. O'DOGHERTY,
J. BARRY.